(12) United States Patent
Meyer et al.

(10) Patent No.: US 11,292,325 B2
(45) Date of Patent: Apr. 5, 2022

(54) ELECTRIC CAR

(71) Applicant: FLET GMBH, Braunschweig (DE)

(72) Inventors: Wolfgang Meyer, Braunschweig (DE); Jochen Grote, Braunschweig (DE)

(73) Assignee: FLET GMBH, Braunschweig (DE)

( * ) Notice: Subject to any disclaimer, the term of this patent is extended or adjusted under 35 U.S.C. 154(b) by 64 days.

(21) Appl. No.: 16/617,558

(22) PCT Filed: May 30, 2018

(86) PCT No.: PCT/EP2018/064243
§ 371 (c)(1),
(2) Date: Apr. 16, 2020

(87) PCT Pub. No.: WO2018/220046
PCT Pub. Date: Dec. 6, 2018

(65) Prior Publication Data
US 2020/0247226 A1 Aug. 6, 2020

(30) Foreign Application Priority Data

May 30, 2017 (DE) .................... 10 2017 111 801.2
Jun. 26, 2017 (EP) .................... 17177846

(51) Int. Cl.
*B60K 1/02* (2006.01)
*B60K 7/00* (2006.01)
*B60K 1/04* (2019.01)

(52) U.S. Cl.
CPC .............. *B60K 1/02* (2013.01); *B60K 1/04* (2013.01); *B60K 7/0007* (2013.01);
(Continued)

(58) Field of Classification Search
CPC .......... B60K 1/02; B60K 1/04; B60K 7/0007; B60K 2001/0405; B60Y 2200/91; B60Y 2400/112
See application file for complete search history.

(56) References Cited

U.S. PATENT DOCUMENTS 5,908,077 A * 6/1999 Moore ............... B60K 6/52
180/65.25
7,913,788 B1 * 3/2011 Bryer ............... B60K 15/063
180/68.5

(Continued)

FOREIGN PATENT DOCUMENTS

CN 2010 054 531 Y 4/2008
CN 201054531 Y 4/2008
(Continued)

*Primary Examiner* — Erez Gurari
(74) *Attorney, Agent, or Firm* — WC&F IP

(57) ABSTRACT

The invention relates to an electric car with (a) a first axle (12), (b) a second axle (14), (c) an electric motor (18) for driving at least one of the axles, which has an electric motor overall height ($h_M$)t, and (d) a battery (22) for supplying the electric motor (18) with electrical energy, which has a battery overall height ($h_B$), wherein (e) the electric motor overall height ($h_M$) corresponds to the battery overall height ($h_B$). According to the invention, (f) the electric motor (18) is composed of at least two electric motor modules (38.1, 38.2) and (g) the electric motor modules (38.1, 38.2) are arranged one behind the other in relation to a motor rotational axis ($D_{18}$); (h) the electric motor modules (38.1, 38.2) have a common rotor shaft (4) or coupled rotor shafts (41); (i) the electric motor (18) and the battery are arranged at the same height; and (j) a battery mass centre of gravity ($S_{22}$) of the battery lies in a central third (Q) between the axles (12, 14).

17 Claims, 10 Drawing Sheets

Figure 1A:
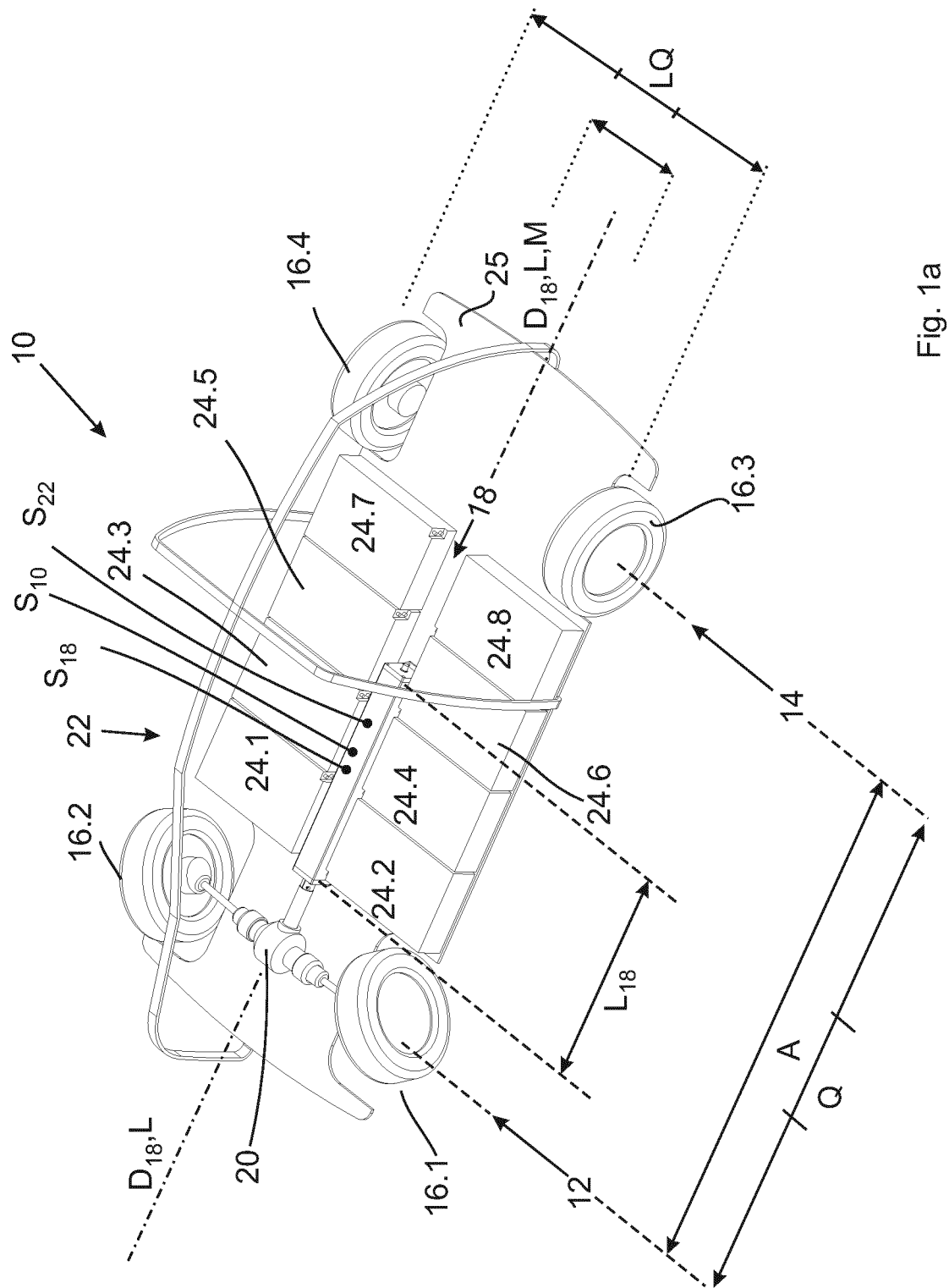

(52) U.S. Cl.
CPC ... *B60K 2001/0405* (2013.01); *B60Y 2200/91* (2013.01); *B60Y 2400/112* (2013.01)

(56) References Cited

U.S. PATENT DOCUMENTS

| | | | |
|---|---|---|---|
| 10,569,641 B1* | 2/2020 | Brewer | B60L 50/52 |
| 11,066,106 B2* | 7/2021 | Nagasaka | B60K 1/04 |
| 2003/0038469 A1* | 2/2003 | Chernoff | B60T 13/74 |
| | | | 280/781 |
| 2005/0224265 A1* | 10/2005 | Mizuno | B60K 1/04 |
| | | | 429/413 |
| 2011/0259657 A1* | 10/2011 | Fuechtner | B60K 7/0007 |
| | | | 180/65.21 |
| 2012/0043144 A1 | 2/2012 | Hwang et al. | |
| 2012/0055721 A1* | 3/2012 | Matano | B60K 1/04 |
| | | | 180/65.1 |
| 2014/0193683 A1* | 7/2014 | Mardall | H01M 10/625 |
| | | | 429/99 |
| 2015/0155801 A1* | 6/2015 | Ross | B60K 1/02 |
| | | | 290/7 |
| 2015/0165900 A1* | 6/2015 | Gagnon | B60K 23/08 |
| | | | 180/242 |
| 2015/0217707 A1 | 8/2015 | Tanigaki et al. | |
| 2016/0355092 A1 | 12/2016 | Higuchi et al. | |
| 2017/0225714 A1* | 8/2017 | Ito | B60L 58/21 |
| 2020/0079201 A1* | 3/2020 | Suzuki | B60K 1/02 |
| 2020/0369140 A1* | 11/2020 | McCarron | B60K 17/06 |
| 2020/0406737 A1* | 12/2020 | Abdyli | B60L 3/0007 |

FOREIGN PATENT DOCUMENTS

| | | |
|---|---|---|
| DE | 10 2011 053254 A1 | 3/2013 |
| JP | 2012041032 A | 3/2012 |
| JP | 2012101589 A | 5/2012 |
| JP | 2017001655 A | 1/2017 |
| WO | 2013/106049 A1 | 7/2013 |
| WO | 2014034377 A1 | 3/2014 |

* cited by examiner

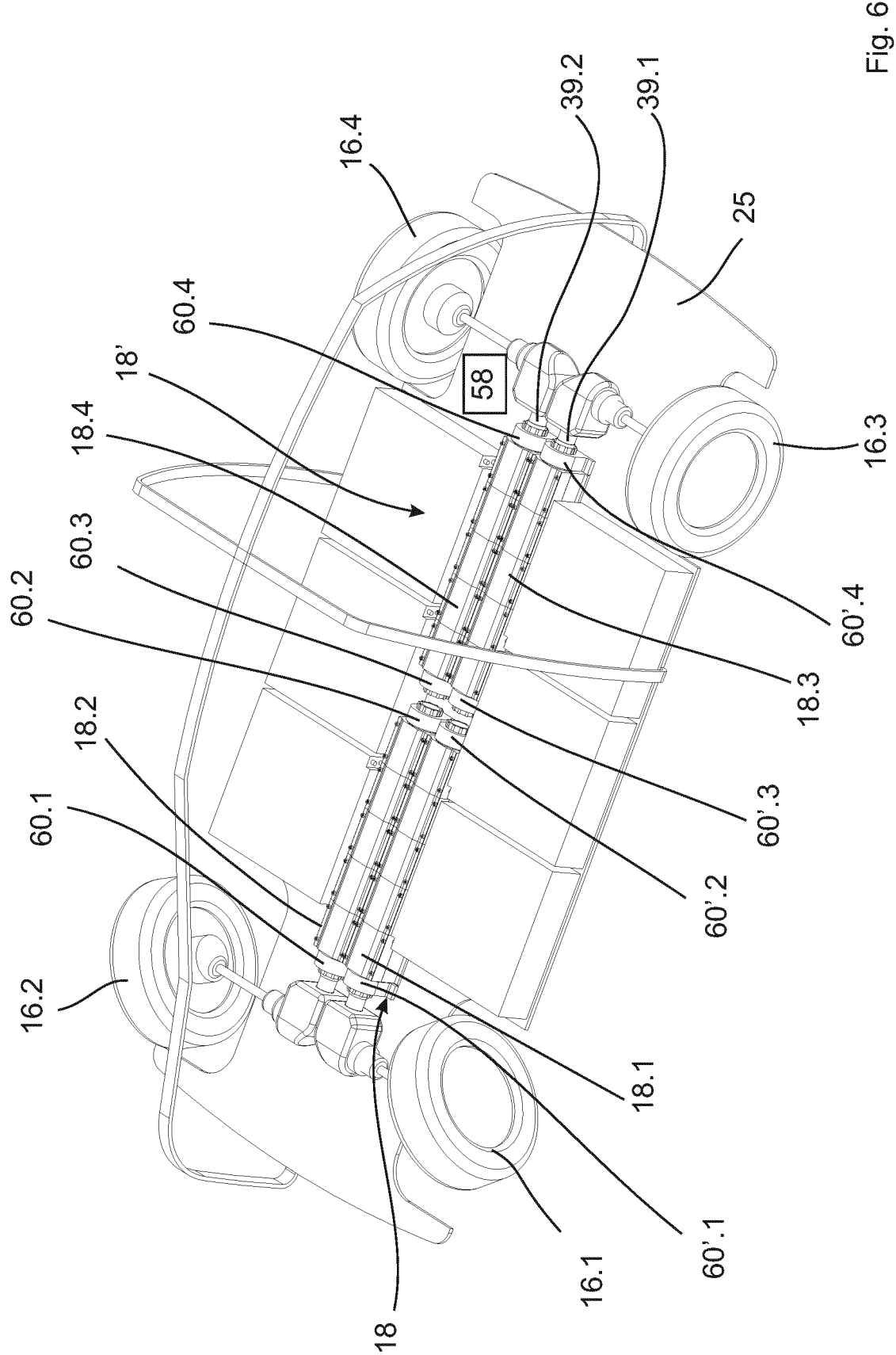

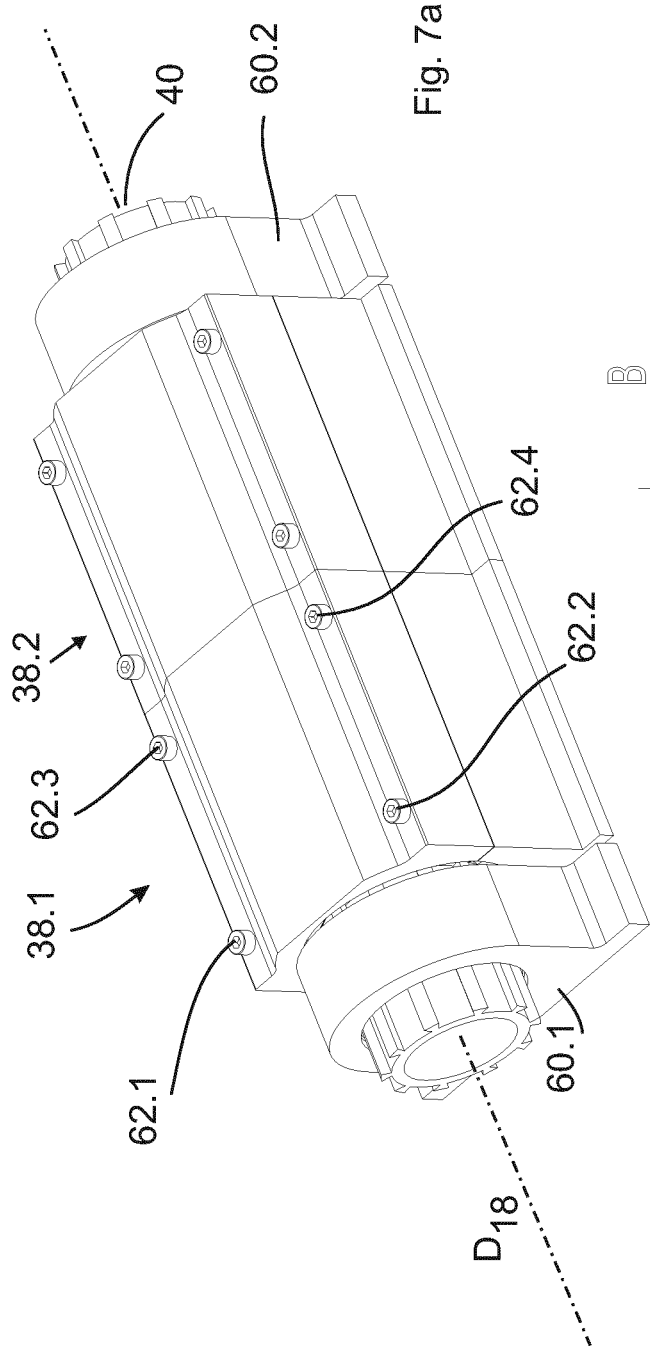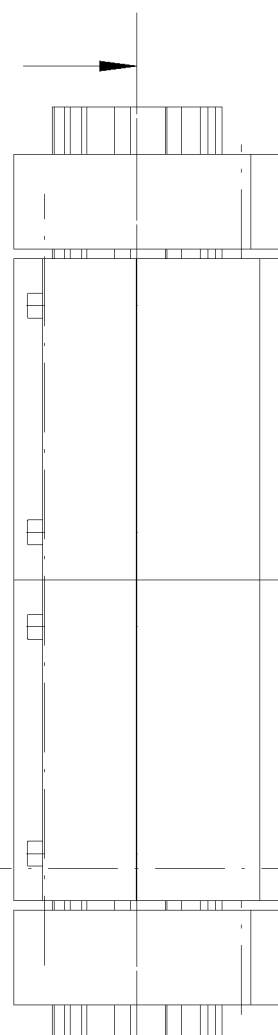

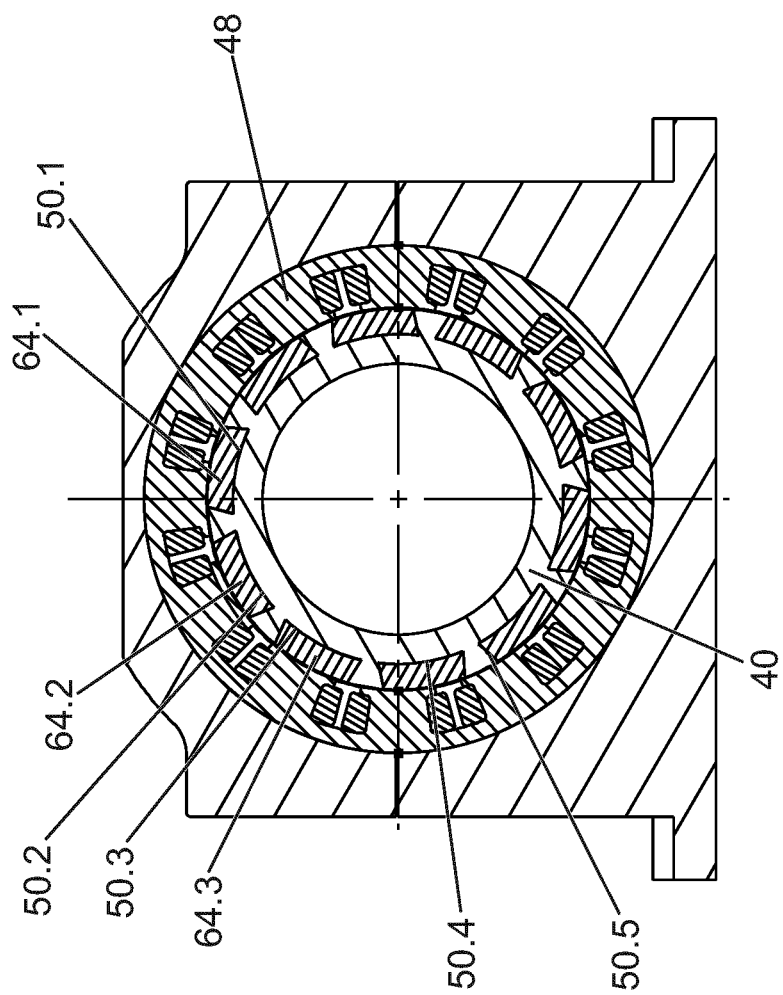

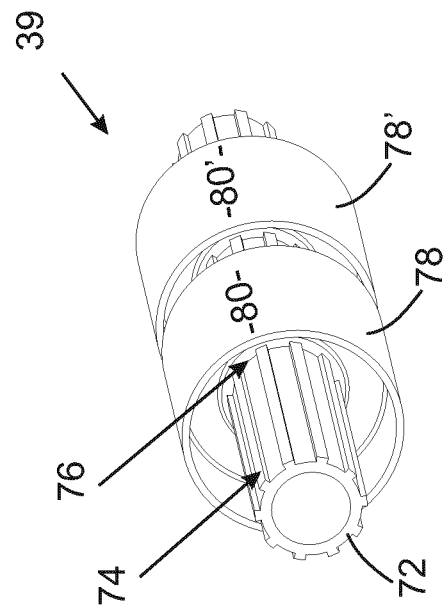
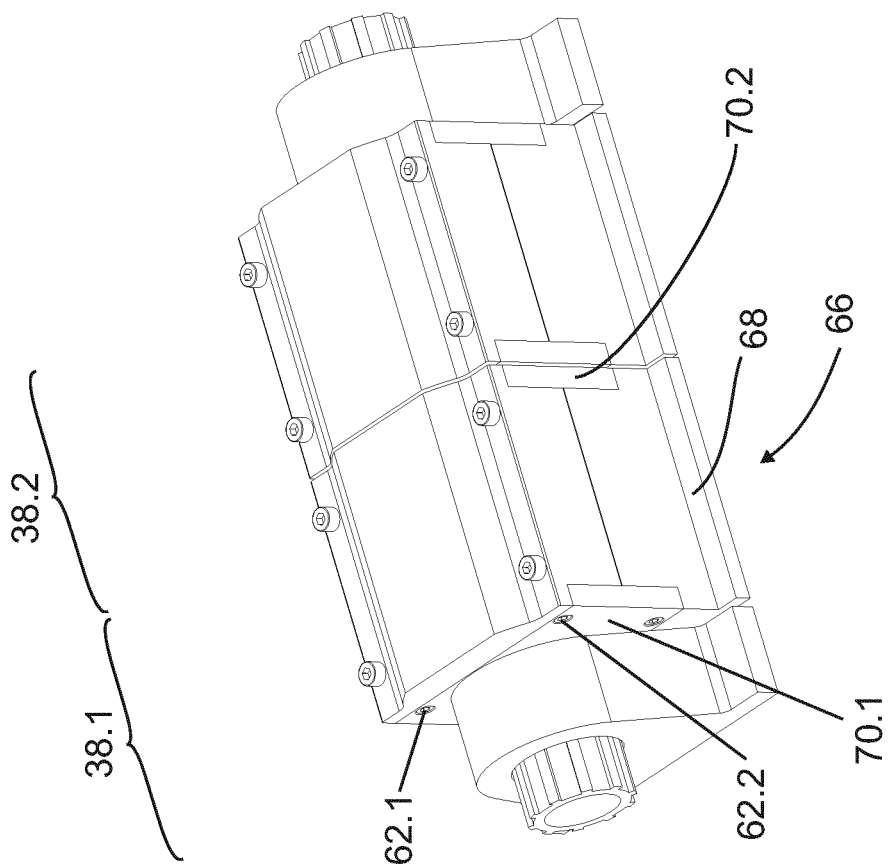

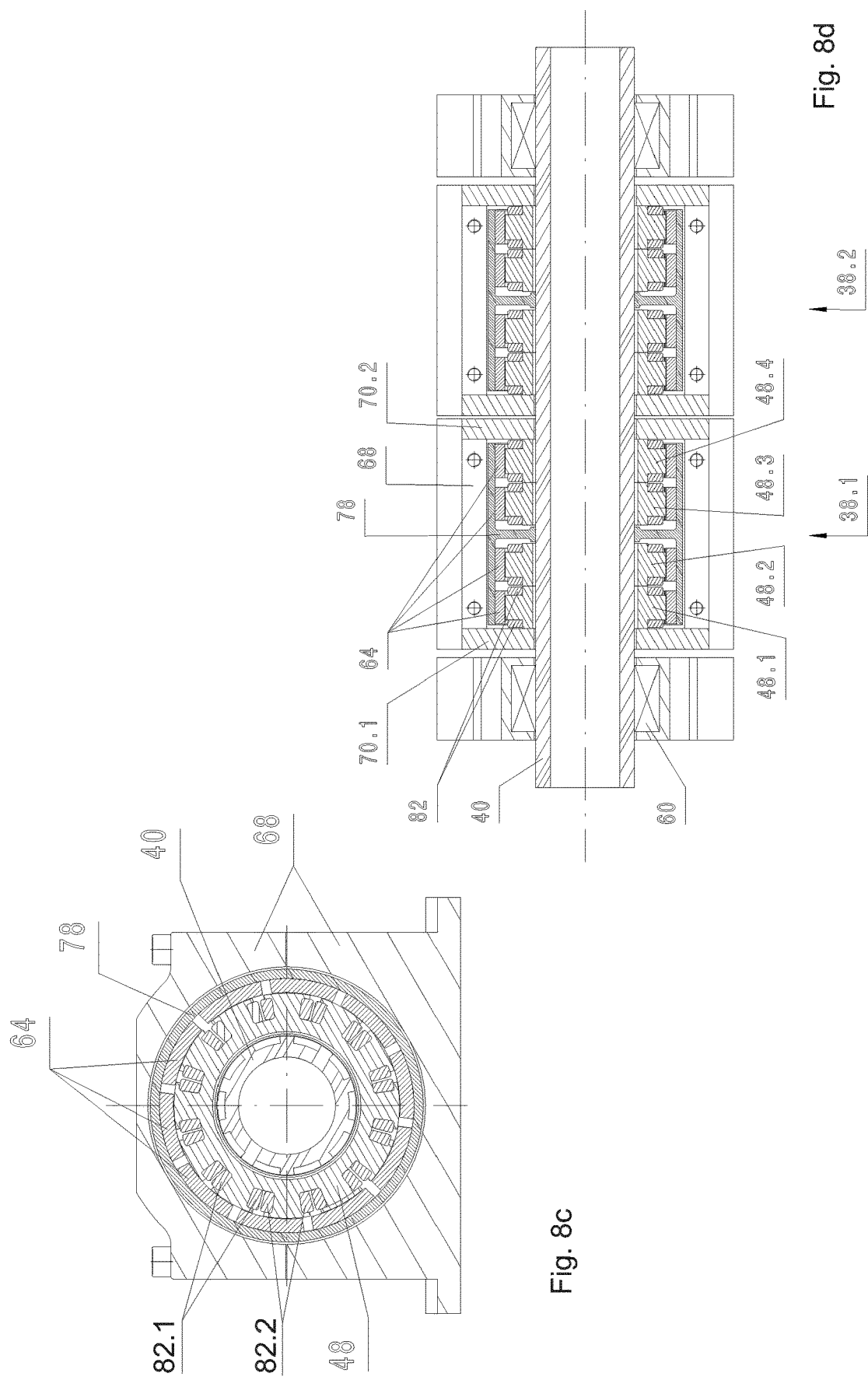

ELECTRIC CAR

The invention relates to an electric car with (a) a first axle, (b) a second axle, (c) an electric motor for driving at least one of the axles, which has an electric motor overall height, and (d) a battery for supplying the electric motor with electrical energy, which has a battery overall height. In its most general form, the invention relates to an electric vehicle. This may be, but does not necessarily need to be, an electric car. The statements made in the following also apply for an electric vehicle in general.

Electric vehicles have been in production for some time and are currently experiencing a renaissance. However, in comparison to vehicles with a combustion engine, their share of the market has remained low. Even though the production of electric vehicles is generally easier and more cost-effective than the production of vehicles with a combustion engine, to date electric motors of different outer dimensions have been used for vehicles of different performance classes.

WO 2013/106 049 A1 describes an electric vehicle, the electric motor of which is supplied with energy from batteries that are arranged along the centre tunnel; the electric motors are not arranged between the wheel axles, but rather in front of the front axle and behind the rear axle. Regarding its drive, such an electric car can barely be modularised.

US 2011/0 259 657 A1 describes an electric car, the electric motors of which can be arranged in a number of configurations. Regarding its drive, this type of electric car is also very difficult to modularise.

US 2015/0155801 A1 describes an electric vehicle in the form of an electric bus, in which two or several axially coupled electric motors are used in the manner of internal rotors. The battery used in this case, with a 2.3-times greater overall height, does not have the same overall height as the electric motor.

DE 10 2011 053 254 A1 describes a modular system for an electric vehicle with a modular structure, in which the battery again extends along the centre tunnel. The rotational axes of the electric motors extend transversely to the longitudinal axis of the vehicle. With this type of electric vehicle, the modularisation of the electric motor drive is subject to strict limitations.

US 2015/0 165 900 A1 describes an electric vehicle with a single electric motor that is arranged centrally between the axles. The batteries are arranged in the area behind the rear axle. Such a vehicle cannot be modularised either.

An electric vehicle is required, regarding its drive, to allow for modularisation as far as possible so that several engine systems can be offered with little expense and effort. In addition, the electric motors must be able to generate particularly high torques with highly compact outer dimensions. To date, it has not been possible to realise such requirements.

The invention aims to propose an improved electric vehicle.

The invention solves the issue by way of an electric vehicle according to the preamble, in which the electric motor overall height corresponds to the battery overall height.

The advantage of this electric vehicle is that the electric motor and the battery can be arranged at the same height, which represents a preferred embodiment and means that the overall height that must be provided for the electric motor and the battery can be selected to be low. It is especially practical if both the battery and the electric motor are arranged below a level at which the driver's seat is situated: this also represents a preferred embodiment. In other words, motor and battery are then fully arranged under the driver's seat. As a result, the centre of gravity of the electric car is so low that it enables a good roadholding.

It is especially beneficial that this adjustment of the overall heights allows for a modularisation of batteries and electric motors. In turn, this renders it possible to efficiently plan and conduct the production of various models with different degrees of drive power.

Within the scope of the present description, an electric vehicle should be understood particularly to mean a land vehicle, such as an electric car or an electric truck. The electric vehicle preferably has four wheels.

The axle should be understood to mean the structural component to which the wheels are fixed. The mathematical axis about which the wheels rotate is referred to as the rotational axis.

In particular, the electric motor overall height is calculated using the imaginary cuboid of minimum volume that contains 90% of the mass of the electric motor. In other words, it is possible that smaller areas of the electric motor protrude or form projections, although this is often impractical.

The battery overall height is calculated in the same way.

The feature that the electric motor and the battery are arranged at the same height should be understood particularly to mean that a vertical distance of the battery mass centre of gravity from the electric motor mass centre of gravity is at most a quarter, specifically at most a fifth, of the overall height of the electric motor.

A battery should be understood to mean a set of several galvanic cells. In particular, the battery comprises galvanic lithium cells. Alternatively or additionally, the battery may comprise at least one flow battery or at least one flow battery module, such as a vanadium flow battery.

It is beneficial if the electric motor drives the wheels of an axle via a differential. However, it is also possible that more than one electric motor is provided, wherein at least one of the electric motors drives only one wheel. In this case, any differences in rotation speed that occur during cornering are electronically adjusted.

Preferably, an electric vehicle is a vehicle for which it can be stated that, at a constant speed of 50 kilometres per hour, at least 50% of the drive torque originates from the electric motor. It is especially beneficial if the vehicle is a purely electric vehicle, i.e. the wheels are driven exclusively by electric power.

It is practical for the electric motor to be arranged completely between the axles. This should be understood to mean that the electric motor is arranged in an area situated between two planes, wherein each plane extends vertically and through the rotational axes of the wheels of the electric vehicle when the vehicle is moving in a straight line.

It is especially beneficial if the distance of the electric motor to the first axle deviates from a distance from the second axle as little as possible, preferably at most by a factor of two. Such an electric vehicle has a particularly small mass moment of inertia regarding the rotation about the vertical axis. The electric vehicle therefore has particularly good handling characteristics.

It is practical if the distance between the foremost end of the electric motor—in relation to the longitudinal axis of the electric vehicle—especially the front electric motor module, and the rearmost end of the electric motor, preferably the rearmost electric motor module, is a maximum of 15% of the wheelbase.

Preferably, the electric vehicle has a vehicle floor. The electric motor and the battery may be arranged on the vehicle floor. Alternatively, they are suspended on the vehicle floor. The advantage of a suspended arrangement is that it is especially easy to realise. An assembly on the vehicle floor offers the advantage of protecting the batteries from external influences.

According to a preferred embodiment, the electric motor is composed of at least two, especially at least three, preferably at least four, electric motor modules, wherein the electric motor modules are arranged one behind the other in relation to a motor rotational axis and have several coupled rotor shafts or a common rotor shaft. The electric motor modules are preferably designed to be structurally identical and connected to one another.

Preferably, a shaft bearing for the continuous rotor shaft of the electric motor is arranged between two electric motor modules. This prevents the rotor from vibrating if the vehicle is driving on an uneven surface.

The electric motor is preferably an external rotor motor, wherein the rotor has an outer section, especially a T-shaped outer section, and wherein the stator comprises at least one coil package, which is arranged between the outer section and the rotor shaft. The outer section, specifically the T-shaped outer section, may also be described as a drum. This results in a high torque at a simultaneously low overall height. In other words, the at least one coil package protrudes between the outer section and the remaining part of the rotor. It is possible, but not necessary, for the drum to be symmetrical in relation to a plane of symmetry, which extends perpendicular to the motor rotational axis. The description 'T-shaped' refers to a cross-section in a plane, in which the centre line lies.

According to a preferred embodiment, the drum and the rotor shaft are positively connected to one another. For example, the drum features an inner toothing and the shaft of the rotor an outer toothing, wherein the drum is connected to the shaft by means of the inner toothing and the outer toothing, the connection being torque-proof. This facilitates assembly.

Preferably, the outer section comprises permanent magnets on its radially inward side. The at least one coil package is in electrical, mechanical and/or thermal contact with a cap of the stator. In other words, the at least one coil package is fixed to the cap of the stator in such a way that the waste heat from the coil package is actively or passively discharged during operation of the electric vehicle.

The electric motor modules are preferably electrically commutated synchronous motors with permanent magnets.

It is especially beneficial if the electric car has an electronic motor controller, by means of which the DC voltage of the battery can be converted into an AC voltage of variable frequency that can be predetermined. This AC voltage is applied to the electric motor modules so that they rotate with a rotation frequency that is equal to the predetermined frequency or a fraction thereof.

It is practical if the electric motor has a structural length that corresponds to at least one third, preferably at least the half, of a wheelbase between the first axle and the second axle. The large structural length leads to a high maximum torque. To date, in order to achieve a high torque, it has been beneficial to increase the rotor diameter. However, due to the preferable modular structure of the electric motor, in this case the structural length can be increased by the simultaneous use of identical electric motor modules, without it resulting in otherwise common disadvantages, such as a more complex production.

It is practical for the rotor to comprise a hollow shaft. This reduces the vibrating mass. In addition, it is possible for the rotor to be cooled from within, by sending a coolant—in particular air or cooling liquid such as water—through the hollow shaft.

It is beneficial if the battery is arranged in such a way that 80%, preferably at least 85%, by weight of the mass of the battery is arranged between the axles. This arrangement lends the electric car particularly good driving properties.

Preferably, a battery mass centre of gravity of the battery and/or an electric motor centre of gravity of the electric motor lies between the axles, in particular in a central third, preferably a central fifth (quintile), between the axles. If the vehicle is positioned in such a way that both axles extend along a horizontal plane, a first vertical plane extends such that the first axle extends along the first vertical axis. A second vertical axis extends in such a way that the second axle extends along the second vertical axis. Both vertical axes run parallel to one another. The central third refers to the area between two further vertical axes, whose distance corresponds to a third of the distance from the first and second vertical axes, whose distance from a central point is equal, wherein said central point lies precisely between the first and second vertical axis. The corresponding mass centre of gravity is then arranged between these two additional vertical axes. Such an arrangement of the batteries or the electric motor results in especially good driving properties, since the mass moment of inertia regarding a yawing, pitching or rolling motion of the electric vehicle is particularly small.

It is beneficial if the electric motor mass centre of gravity in relation to the longitudinal direction of electric motor lies in the central third, especially in the central fifth. The central third extends transversely to the longitudinal axis, i.e. in the direction of extension of the axles. The geometric centre line in relation to the longitudinal direction is the straight line that lies at the same distance from the left and right front wheel and the left and right rear wheel. The centre line extends centrally through the central third.

The floor of the passenger area preferably does not feature a centre tunnel. Since the battery and the electric motor have the same overall height, a centre tunnel is not necessary for accommodating an enlarged electric motor. The invention is based on the knowledge that it is beneficial to increase the torque of the electric motor by designing it to be long. To date, vehicles have relied on electric motors with the largest possible rotor diameter and a small structural length to increase the torque. However, this results in an impractical position of the electric motor mass centre of gravity and/or renders a centre tunnel necessary. The electric vehicle according to the invention does not require a centre tunnel.

The feature that the floor of the passenger does not feature a centre tunnel should be understood particularly to mean that to floor is even in the technical sense. In other words, elevations are possible, but the maximum elevation is small. Specifically, the maximum elevation between the driver's seat and the front passenger's seat is at most 10 centimetres above a conceived correction plane through the floor of the passenger area.

The electric vehicle preferably has a longitudinal axis and the motor rotational axis extends along the longitudinal axis. This should be understood especially to mean that it is possible, but not necessary, for the motor rotational axis to extend parallel to the longitudinal axis. Specifically, an offset angle between the motor rotational axis and the longitudinal axis is possible, wherein said angle is preferably at most 20°, in particular at most 5°.

The battery preferably comprises at least two battery units, wherein the motor rotational axis extends between the battery units. The feature that the motor rotational axis extends between the battery units should be understood to mean that a projection of the motor rotational axis on a plane—along which the first axle and the second axle extend—extends between a first battery unit mass centre of gravity of the first battery unit and a second battery unit mass centre of gravity of the second battery unit. It is especially beneficial if the rotational axis extends in such a way that—in relation to a respective projection on the plane along which the two axes extend—the first battery unit is separated from the second battery unit. In other words, a galvanic element of a battery unit does not run from one side of the projection of the rotational axis to the other. However, it is possible that electrical connectors, especially cables, run from one side of the projection of the rotational axis to the other.

The electric motor preferably features a rotor with permanent magnets. Here, it is possible that the electric motor is an internal rotor motor. A common, but not necessarily better, alternative is an outer rotor motor, which produces a considerably higher torque with the same outer dimensions.

The electric vehicle preferably has a differential and a gearbox, which is arranged in the torque flow between the motor and the differential. It is possible, but not necessary, for the electric vehicle to comprise a second differential and a second gearbox, which is arranged in the torque flow between the motor and the second differential. The first differential preferably drives the wheels of the front axle. The second differential preferably drives the wheels of the rear axle. With two differentials, a four-wheel drive can be realised. The first differential and/or the second differential are both rigidly coupled with the corresponding rotor of the electric motor.

The electric motor can be produced particularly easily if it features a rotor with permanent magnets, wherein the rotor comprises grooves that extend in the longitudinal direction, the permanent magnets being arranged in said grooves. For example, the permanent magnets are inserted into the grooves.

To achieve particularly high torques and/or simply realise a four-wheel drive, it is beneficial if the electric vehicle comprises a second electric motor, which is composed of at least two, especially at least three, at least four, at least five, at least six or more second electric motor modules, wherein the second electric motor modules have a common second rotor and wherein the first rotor and the second rotor run parallel to one other. Here, it is possible that the first electric motor drives the wheels of the first axle and the second electric motor drives the wheels of the second axle.

Alternatively, it is also possible that the first electric motor and the second electric motor drive the wheels of one of the axles together, for instance the wheels of the front axle and/or the rear axle. The number of second electric motor modules is preferably smaller than 30.

According to a preferred embodiment, the electric motor comprises a second electric motor, which is preferably composed of at least two electric motor modules, a third electric motor, which is preferably composed of at least two electric motor modules, and a fourth electric motor, which is preferably composed of at least two electric motor modules, wherein each of the electric motors drives a wheel, specifically via an angular gearbox. It is beneficial if all electric motor modules are structurally identical. It is then beneficial if all motors are driven by a motor control system such that they apply the same torque to the respective wheel, wherein they are preferably prevented from skidding. This type of anti-skid control belongs to the prior art and shall therefore not be described in further detail in the following.

The stator preferably comprises a base body and a second coil package, wherein the coil package is fixed to a cap of the stator and wherein the cap is reversibly fixed to the base body. This facilitates the assembly of the electric motor.

In the following, the invention will be explained in more detail by way of the attached figures. They show FIG. 1a a three-dimensional partial view of an electric vehicle according to the invention, according to first embodiment, FIG. 1b the electric vehicle according to FIG. 1a in a sectional view from behind, FIG. 2 an electric vehicle according to a second embodiment, FIG. 3 an electric vehicle according to the invention, according to a third embodiment, FIG. 4 an electric vehicle according to the invention, according to a fourth embodiment, FIG. 5 an electric vehicle according to the invention, according to a fifth embodiment, FIG. 6 an electric vehicle according to the invention, according to a sixth embodiment, FIG. 7 with the partial FIGS. 7a and 7b as isometric views and partial FIG. 7c as a sectional view of an electric motor as an internal rotor for an electric vehicle according to the invention, and FIG. 8 with the partial FIGS. 8a and 8b as isometric views and partial FIGS. 8c and 8d as sectional views of an electric motor as an external rotor for an electric vehicle according to the invention.

Figure 1B:
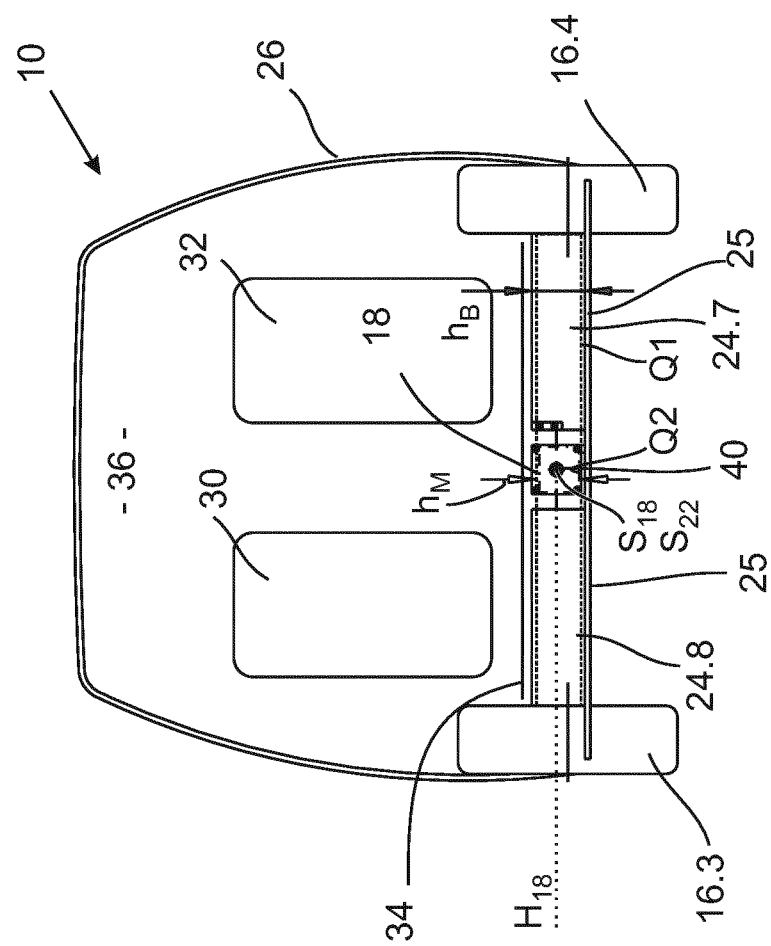

FIG. 1a depicts an electric vehicle 10 according to the invention in the form of an electric car, which comprises a first axle 12 in the form of a front axle and a second axle 14 in the form of a rear axle. Wheels 16.1, 16.2 are fixed to the first axle 12; wheels 16.3, 16.4 are fixed to the second axle 14. An electric motor 18 drives the wheels 16.1, 16.2 of the first axle 12 via a differential gearbox 20, which may also be referred to as a differential.

The electric motor 18 is supplied with power from a battery 22. The battery 22 comprises at least two—in the present case eight—battery units 24.1, 24.2, . . . , 24.8.

It is clear to see that a motor rotational axis $D_{18}$ extends between the battery units 24.1, 24.3, 24.5, 24.7 on one side and 24.2, 24.4, 24.6 and 24.8 on the other. A mass $m_r$ of the battery units 24.1, 24.3, 24.5 and 24.7 arranged to the right of the motor rotational axis $D_{18}$ corresponds to a mass $m_l$ of the battery elements to the left of the motor rotational axis $D_{18}$, i.e. in the present case of the battery elements 24.2, 24.4, 24.6 and 24.8.

The feature that the two masses $m_r$, $m_l$ correspond to each other should be understood particularly to mean that the two masses deviate from one another by a maximum of 20%, preferably a maximum of 15%.

The electric vehicle 10 has a vehicle floor 25. In the present embodiment, both the battery 22 and the electric motor 18 are mounted on the vehicle floor 25. The electric vehicle 10 also has components that are not depicted, such as an outer casing, in particular made of sheet metal, seats and a steering system.

FIG. 1a also demonstrates that the electric motor mass centre of gravity $S_{18}$ is situated in a central longitudinal quarter LQ, especially in a longitudinal fifth. In general, it is beneficial for the electric motor mass centre of gravity $S_{18}$ to be situated as close as possible to a centre line M.

It should also be recognised that all battery modules 24 are—and thus that the battery 22 is—arranged between the axles 12, 14. However, it is also possible that a part of the battery modules 24.$j$ ($j$=1, 2, . . . , number of battery modules) is arranged on the other side of the axles; however, it is beneficial if at least 80% by weight of the mass of the battery modules 24.$j$ is arranged between the axles. In the present embodiment, the structural length $L_{18}$ of the electric motor 18 is 0.4 times the wheelbase A.

FIG. 1$b$ shows the electric vehicle 10 in a view from behind. It should be recognised that an electric motor overall height $h_M$ corresponds to a battery overall height $h_B$. The electric motor overall height $h_M$ is the height of the conceived cuboid $Q_1$ of minimal volume, which encloses 90% of the mass of the battery 22. FIG. 1$b$ also shows a body 26 of the electric vehicle 10. A driver's seat 30 and a front passenger's seat 32 are also depicted, both of which are arranged on an even floor 34 of a passenger area 36.

It should be noted that the electric motor mass centre of gravity $S_{18}$ is at a height $H_{18}$, which corresponds to a height $H_{22}$ of the battery mass centre of gravity $S_{22}$.

Figure 2:
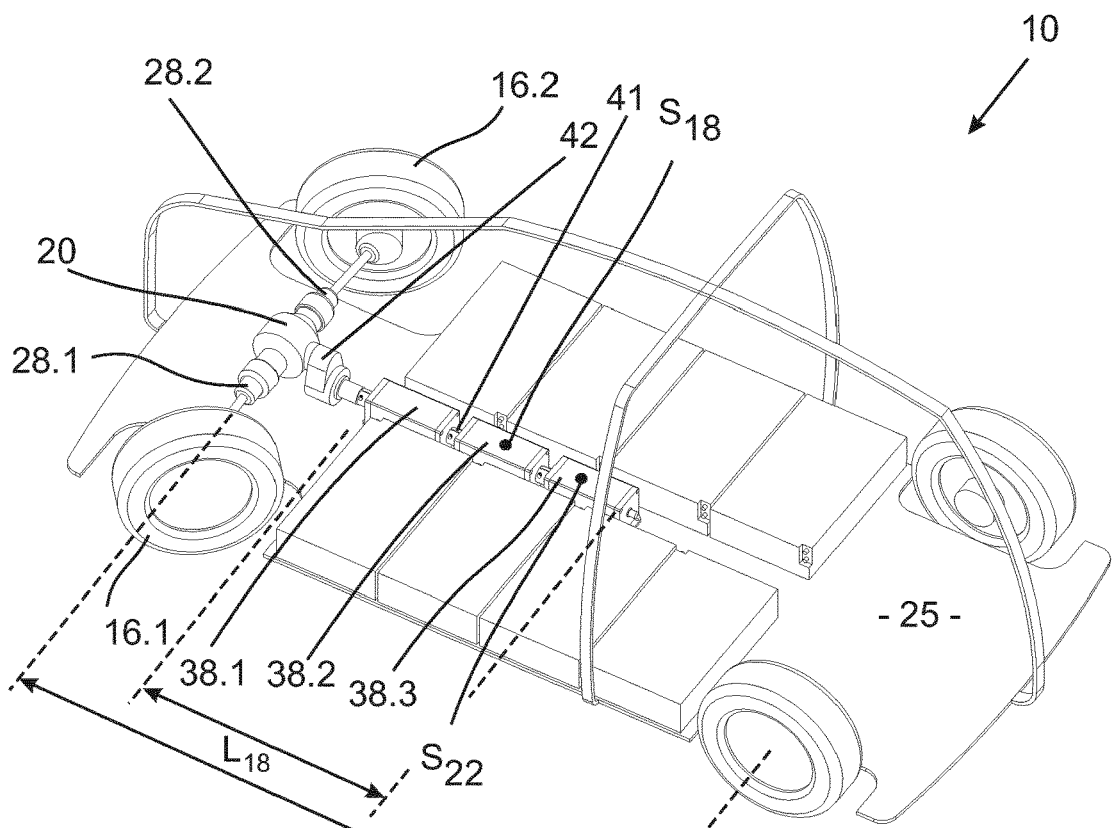

FIG. 2 depicts a second embodiment of an electric vehicle 10 according to the invention, wherein the electric motor 18 is composed of three electric motor modules 38.1, 38.2, 38.3 that are coupled one behind the other. All three electric motor modules 38.1, 38.2, 38.3 are structurally identical and comprise rotor shafts 41 that are coupled with one another. It is possible, but not necessary, for each electric motor module 38.$i$ ($i$=1, . . . N; N: number of electric motor modules) to have its own rotor element—as is the case in the present embodiment—wherein the individual rotor elements are connected to one another, thereby forming the rotor 39. It is possible that the rotor is designed to be free of joints. The electric motor modules 38.$i$ are structurally identical.

FIG. 2 shows that the electric vehicle 10 features an additional gearbox 42 between the differential gearbox 20 and the electric motor 18. This renders possible a simple adjustment of the rotor speed to match the wheel speed. In particular, the electric motor may be driven at higher speeds than without the gearbox 42, wherein said gearbox preferably refers, accordingly, to a reduction gearbox.

In the present embodiment, the structural length $L_{18}$ of the electric motor 18 is also 0.4 times the wheelbase A.

Figure 3:
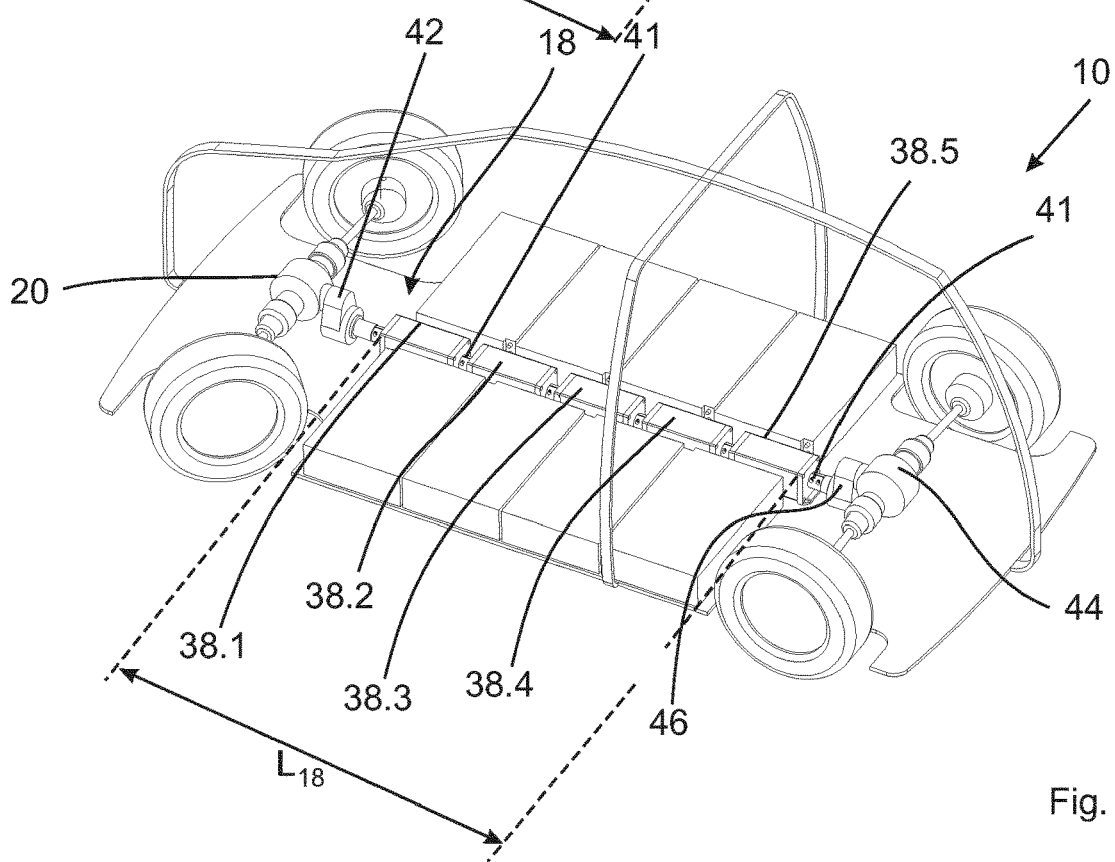

FIG. 3 shows a further embodiment of an electric vehicle 10 according to the invention; the coupled rotor shafts 41 of the electric motors 18 are rigidly connected to both the differential 20 and a second differential 44. In the present case, the end of the coupled rotor shaft 41 is connected to the second differential 44 via a second gearbox 46.

Unlike in the embodiment according to FIG. 2, the electric motor 18 has five electric modules 38.$i$ (N=5). A maximum torque $M_{max}$ of the electric motor according to FIG. 2 is $M_{max}$=300 Nm. Conversely, the maximum torque $M_{max}$ for the electric vehicle according to FIG. 3 is $M_{max}$=500 Nm. It should be recognised that the maximum torque increases in a linear fashion with the number of electric motor modules N.

In this embodiment, the structural length $L_{18}$ of the electric motor 18 is 0.7 times the wheelbase A.

Figure 4:
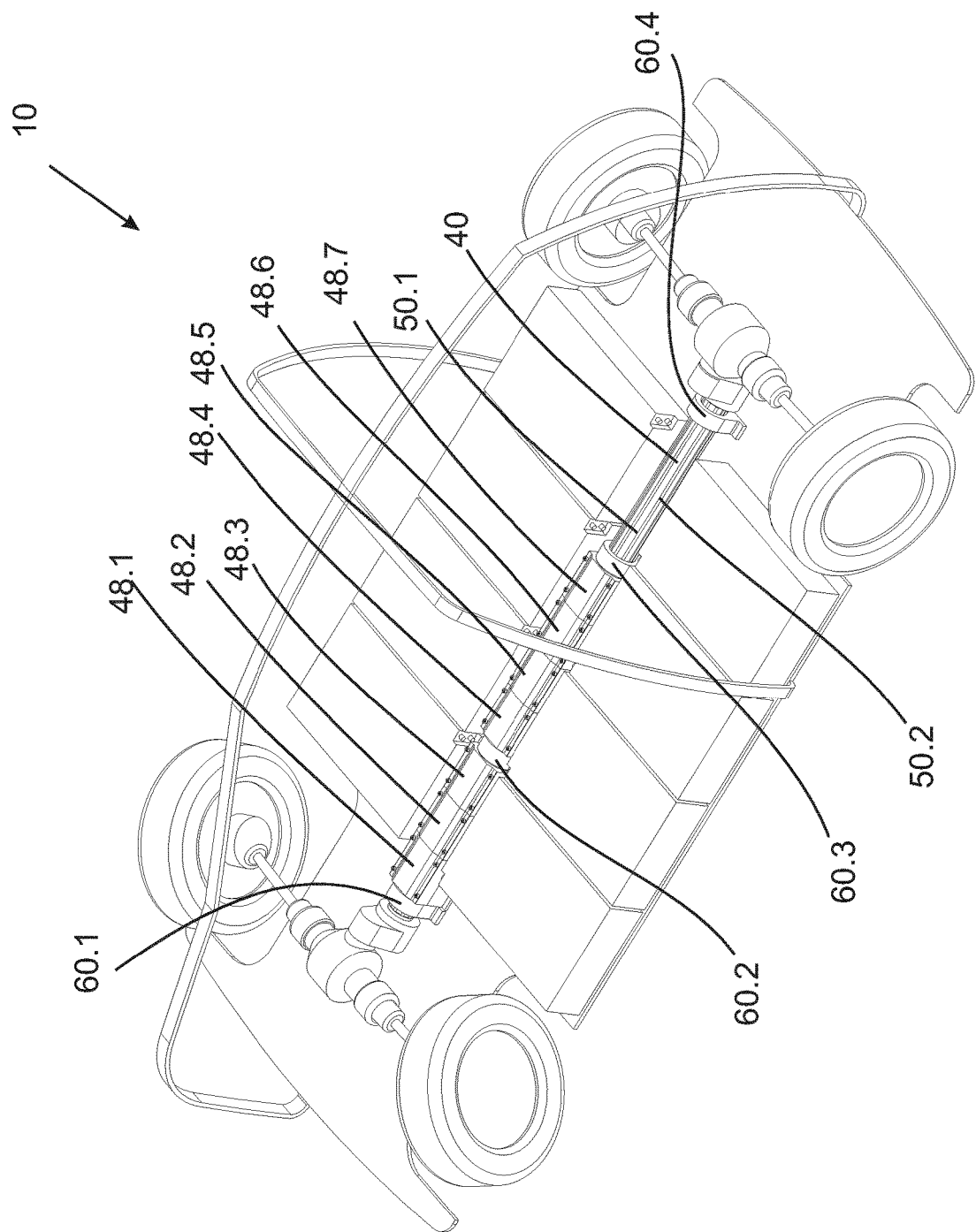

FIG. 4 shows a fourth embodiment of an electric vehicle 10 according to the invention. The electric motor 18 features several stator coil packages 48.1, . . . , 48.$N_{48}$ ($N_{48}$: number of coil packages). Each stator coil package 48.$j$ ($j$=1, . . . , $N_{48}$) can be removed without having to remove the continuous rotor shaft 40. It should be recognised that the continuous rotor shaft 40 comprises grooves 50.1, 50.2, into which permanent magnets are inserted; said magnets are not depicted for the sake of clarity. The electric motor according to FIG. 4 is an internal rotor.

Figure 5:
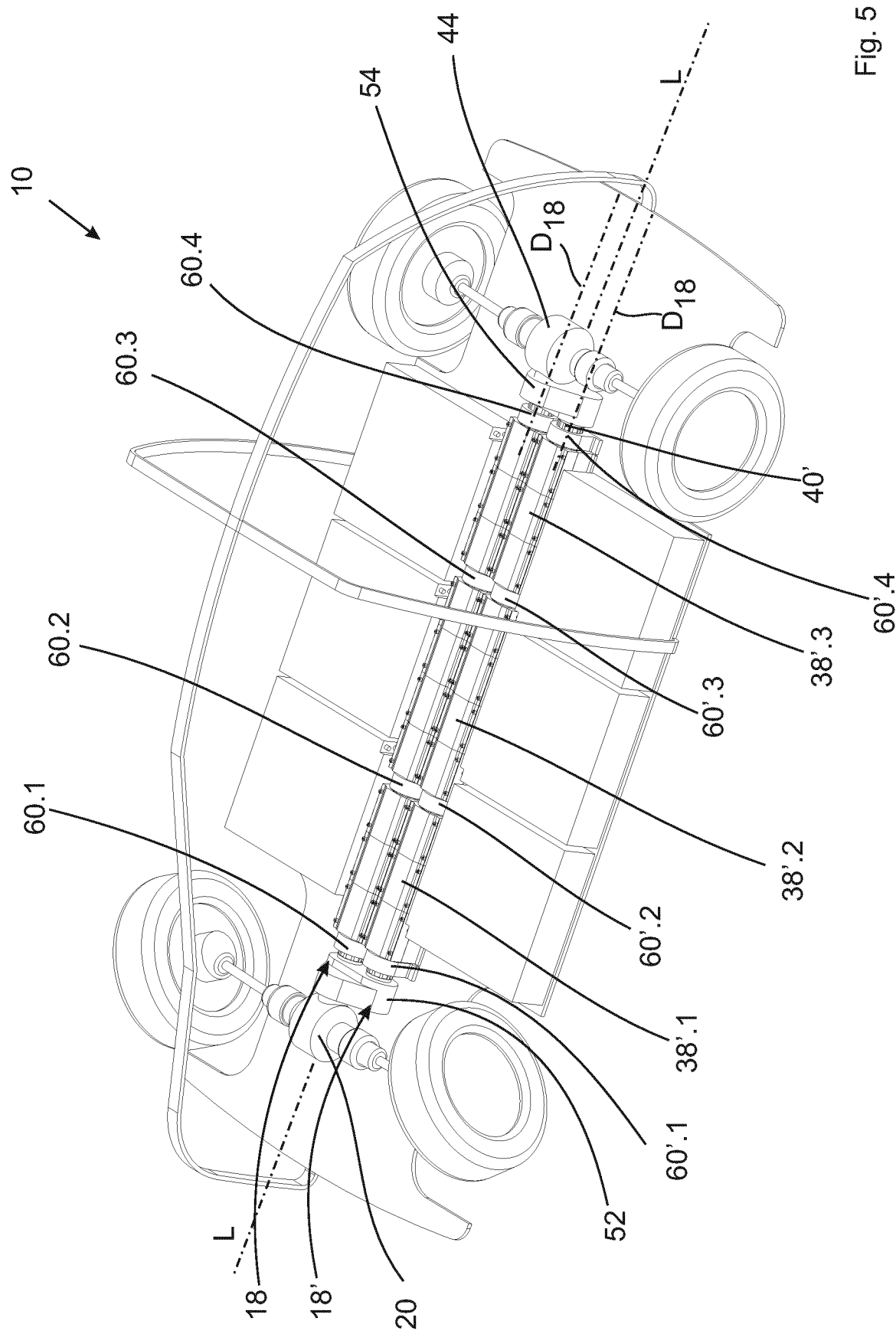

FIG. 5 depicts a fifth embodiment of an electric vehicle 10 according to the invention, which has a second electric motor 18'. The second electric motor comprises three electric motor modules 38'.1, 38'.2 and 38.'3. The two electric motor modules 38'.1, and 38.'3 are structurally identical. The continuous rotor shaft 40' runs, in the technical sense, parallel to the continuous rotor shaft 40, i.e. small deviations of, for instance, a maximum of 5° are tolerable. Both continuous rotor shafts 40 and 40' and thereby the allocated motor rotational axes $D_{18}$, $D'_{18}$ also extend along a longitudinal axis L of the electric vehicle 10, as is the case in the remaining embodiments.

The two electric motors 18, 18' collectively drive a first coupling mechanism 52 and a second coupling mechanism 54. The first coupling mechanism 52 is rigidly coupled with the first differential 20; the second coupling mechanism 54 is rigidly connected to the second differential 44.

FIG. 6 depicts a sixth embodiment of an electric vehicle 10 according to the invention in which 4 electric motors 18.1, 18.2, 18.3 and 18.4 are used. Here, the first electric motor 18.1 drives the first wheel 16.1 and the second electric motor 18.2 drives the second wheel 16.2. The third electric motor 18.3 drives the third wheel 16.3 and the fourth electric motor 18.4 drives the fourth wheel 16.4. The electric vehicle 10 also features a schematically depicted motor control system 58, which is connected to all electric motors and the battery. The motor control system 58 is designed to control all electric motors 18.1, . . . , 18.4 in such a way that, when the electric vehicle 10 is cornering, the different angular speeds of the wheels give rise to adapted speeds of the respective electric motors, such that the skid on all wheels 16.$i$ is the same size and ideally has a value of zero. It is possible that each electric motor is composed of two or more structurally identical electric motor modules.

In all the electric vehicles shown, a battery mass centre of gravity $S_{22}$ (see FIG. 1$a$) lies between the axles 12, 14. In the embodiments shown, a distance of the battery mass centre of gravity $S_{22}$ from a vehicle mass centre gravity point $S_{10}$ is at most a quarter of a wheelbase A of the two axles 12, 14. An electric motor mass centre of gravity $S_{18}$ is also situated close to the vehicle mass centre of gravity $S_{16}$, specifically in a central quintile Q along the longitudinal axis L between the axles 12, 14.

FIG. 1$b$ demonstrates that the battery 22, in particular its galvanic cells, are not situated underneath the electric motor 18. In other words, all battery modules 24.$i$ are arranged to either the left or the right of—but not above or below—the electric motor 18 in relation to the longitudinal axis L.

FIG. 7$a$ shows two electric motor modules 38.1. and 38.2, which lie one behind the other, in the version that features an internal rotor and a shaft bearing 60.1, 60.2, by way of which the continuous rotor shaft 40 is mounted and fixed to the vehicle floor 25 (see FIG. 4, 5). It should be recognised that the electric motor modules 38.1, 38.2 can be removed by means of detachable fixing elements, in the present case in the form of screws 62.1, . . . .

All electric motor modules 38.$k$ ($k$=1, 2, . . . number of electric motor modules) are electrically commutated, permanently excited synchronous motors.

In a vertical cut through an electric motor module of the internal rotor version, FIG. 7$b$ demonstrates that permanent magnets 64.1 . . . are inserted in the grooves 50.1, 50.2 . . . of the continuous rotor shaft 40, wherein said permanent magnets are induced to rotation by the coil package 48.

FIG. 7c depicts a lateral view of the electric motor modules 38.1 and 38.2 of the internal rotor version.

FIG. 8 shows two electric motor modules 38.1 and 38.2, which lie one behind the other, in the version that features an external rotor, the stator 66 of which features a base body 68 as well as a first cap 70.1 and a second cap 70.2. The caps 70.1, 70.2 are reversibly fixed to the base body 68 using screws 62.1, 62.2, ..., 62.8. Each cap 70.i is securely connected to at least one stator coil package.

FIG. 8b depicts a to-scale view of the rotor 39, which comprises a shaft 72 in form of a hollow shaft, as do the remaining partial figures of FIG. 8. The shaft 72 features an outer toothing 74; a drum 78 lies on said outer toothing by way of an inner toothing 76. The drum 78 forms a T-shaped outer section of the rotor 39. It should be recognised that the rotor 39 also features a second drum 78'. Of course, further rotor houses may be provided. For example, the electric motor comprises at least three drums. In FIG. 8b, the permanent magnets of the rotor are not depicted for the sake of clarity.

FIG. 8c shows a cut through the electric motor module 38.1 of the external rotor version. It should be noted that the permanent magnets 64 are arranged on an inner side of a cylinder barre/portion 80 of the drum 78. They are moved by the stator coil package 48. For instance, the permanent magnets 64.i are inserted in grooves in the radially inward side of the cylinder barre/portion 80.

FIG. 8d depicts a sectional view through the electric motor modules 38.1 and 38.2 of the external rotor version with the T-shaped drums 78 and 78'. It should be recognised that coils 82.i are rigidly mechanically connected and also thermally connected to the cap 70 of the stator 66. In other words, at least one coil package 48, which comprises the coils 82.i, is fixed to the cap 70 of the stator 66 in such a way that the waste heat from the coil package 48 is actively or passively discharged during operation of the electric vehicle.

REFERENCE LIST

10 electric vehicle
12 first axle
14 second axle
16 wheels
18 electric motor
20 differential
22 battery
24 battery module
25 vehicle floor
26 body
28 drive shaft
30 driver's seat
32 front passenger's seat
34 floor
36 passenger area
38 electric motor module
39 rotor
40 rotor shaft, continuous
41 rotor shaft, coupled
42 gearbox
44 second differential
46 second gearbox
48 stator coil package
50 groove
52 first coupling mechanism
54 second coupling mechanism
56 electric motor unit
58 motor control system
60 shaft bearing
62 screws
64 permanent magnet
66 stator
68 base body
70 cap
72 shaft
74 outer toothing
76 inner toothing
78 drum
80 cylinder barre/portion
82 coil
A wheelbase
$D_{18}$ motor rotational axis
$h_M$ electric motor overall height
$h_B$ battery overall height
i running index
running index
L longitudinal axis
$m_l$ mass of the battery elements to the left of the motor rotational axis
$m_r$ mass of the battery elements to the right of the motor rotational axis
$M_{max}$ maximum torque
$N_{38}$ number of electric motor modules
$N_{48}$ number of stator packages
Q central percentile
LQ longitudinal quarter
$S_{22}$ battery mass centre of gravity
$S_{18}$ electric motor macs centre of gravity
$S_{10}$ vehicle mass centre of gravity

The invention claimed is:

1. An electric car, comprising:
   (a) a first axle,
   (b) a second axle,
   (c) an electric motor for driving at least one of the first and second axles which has an electric motor overall height ($h_M$), and
   (d) a battery for supplying the electric motor with electrical energy, said battery having a battery overall height ($h_B$), wherein
   (e) the electric motor overall height ($h_M$) corresponds to the battery overall height ($h_B$),
   wherein
   (f) the electric motor is composed of at least two electric motor modules,
   (g) the at least two electric motor modules are arranged one behind the other in relation to a motor rotational axis ($D_{18}$),
   (h) the at least two electric motor modules have a common rotor shaft or coupled rotor shafts,
   (i) the electric motor and the battery are arranged at the same height, and
   (j) a battery mass centre of gravity ($S_{22}$) of the battery lies in a central third between the first and second axles.

2. The electric car according to claim 1, wherein
   (a) the electric motor is an external rotor motor,
   (b) a rotor of the external rotor motor has a T-shaped drum, and
   (c) a stator of the external rotor motor comprises at least one coil package which is arranged between the T-shaped drum and the common rotor shaft or coupled rotor shafts.

3. The electric car according to claim 2, wherein the T-shaped drum is T-shaped in a radial direction in relation to a cross-section.

4. The electric car according to claim 2 wherein
the T-shaped drum has a form-fit contour,
(b) the common rotor shaft or coupled rotor shafts has a form-fit contour, and
(c) the T-shaped drum is connected to the common rotor shaft or coupled rotor shafts by the form-fit contours such that a connection created therebetween is torque-proof.

5. The electric car according to claim 2 wherein
(a) the stator is connected to a base body via a cap and comprises at least two or more coil packages, and
(b) the at least two or more coil packages are fixed to the cap of the stator,
(c) wherein the cap is reversibly fixed to the base body.

6. The electric car according to claim 1 wherein
an electric motor mass centre of gravity ($S_{18}$) of the electric motor lies in the central third between the first and second axles.

7. The electric car according to claim 1 wherein
the battery features at least two battery units, and
the motor rotational axis ($D_{18}$) extends between the at least two battery units.

8. The electric car according to claim 1, further comprising:
(a) a differential, and
(b) a gearbox arranged in a torque flow between the motor and the differential.

9. The electric car according to claim 8, further comprising:
(a) a second differential, and
(b) a second gearbox arranged in a torque flow between the motor and the second differential.

10. The electric car according to claim 1, wherein
as an internal rotor, the electric motor has a rotor shaft with permanent magnets, and
the rotor shaft comprises grooves that extend in a longitudinal direction, the permanent magnets being arranged in said grooves.

11. The electric car according to claim 1, further comprising:
a second electric motor which is composed of at least two second electric motor modules,
wherein the at least two second electric motor modules feature a common second rotor, and
wherein the rotor shaft and the common second rotor extend parallel to one another.

12. The electric car according to claim 1, further comprising:
(a) a second electric motor,
(b) a third electric motor, and
(c) a fourth electric motor,
(d) wherein each electric motor drives a wheel.

13. The electric car according to claim 1 wherein the electric motor mass centre of gravity ($S_{18}$) is situated in a central longitudinal quarter.

14. An electric motor for an electric car according to claim 1, wherein
(a) the electric motor is an external rotor motor, and wherein the electric motor comprises
(b) a stator which has at least one coil package, and
(c) a rotor which comprises a drum which radially surrounds the at least one coil package as a sleeve.

15. The electric motor according to claim 14, wherein
the drum is T-shaped in the radial direction in relation to a cross-section.

16. The electric motor according to claim 14 wherein
the drum has a form-fit contour,
(b) the rotor shaft has a form-fit contour, and
(c) the drum is connected to the rotor shaft by the form-fit contours such that the connection is torque-proof.

17. The electric motor according to claim 14 wherein
the stator is connected to a base body via a cap and comprises at least two or more coil packages, and
the two or more coil packages are fixed to the cap of the stator,
wherein the cap is reversibly fixed to the base body.

* * * * *